United States Patent
Lee et al.

(10) Patent No.: US 11,527,901 B2
(45) Date of Patent: Dec. 13, 2022

(54) BATTERY PACK AND METHOD FOR CONTROLLING BATTERY PACK

(71) Applicant: Samsung SDI Co., Ltd., Yongin-si (KR)

(72) Inventors: Youngjin Lee, Yongin-si (KR); Jaeseung Kim, Yongin-si (KR); Gilchoun Yeom, Yongin-si (KR); Kwanil Oh, Yongin-si (KR); Hyeoncheol Jeong, Yongin-si (KR); Seunglim Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 293 days.

(21) Appl. No.: 16/620,673

(22) PCT Filed: Jan. 22, 2018

(86) PCT No.: PCT/KR2018/000951
§ 371 (c)(1),
(2) Date: Dec. 9, 2019

(87) PCT Pub. No.: WO2018/225921
PCT Pub. Date: Dec. 13, 2018

(65) Prior Publication Data
US 2021/0143656 A1 May 13, 2021

(30) Foreign Application Priority Data
Jun. 9, 2017 (KR) .................. 10-2017-0072723

(51) Int. Cl.
*H02J 7/00* (2006.01)
*G05B 15/02* (2006.01)

(52) U.S. Cl.
CPC ............ *H02J 7/0068* (2013.01); *G05B 15/02* (2013.01); *H02J 7/0042* (2013.01)

(58) Field of Classification Search
USPC ......................................................... 320/128
See application file for complete search history.

(56) References Cited

U.S. PATENT DOCUMENTS 10,044,211 B2    8/2018   Seo et al.
2007/0139006 A1*   6/2007   Yasuhito ............. H01M 10/441
                                                                                                            320/116
(Continued)

FOREIGN PATENT DOCUMENTS

CN         103444258 A    12/2013
JP          11-69644 A     3/1999
(Continued)

OTHER PUBLICATIONS

International Search Report for corresponding International Application No. PCT/KR2018/000951, dated May 1, 2018, 5pp.

(Continued)

*Primary Examiner* — Mohammed Alam
(74) *Attorney, Agent, or Firm* — Lewis Roca Rothgerber Christie LLP (57) ABSTRACT

Provided is a method of controlling a battery pack, and a battery pack controlled by the method. A battery pack includes a plurality of slave battery modules, each of the slave battery modules including a battery that includes at least one battery cell and a slave controller that is configured to control charge and discharge of the battery, a master battery module including a master controller that is configured to control the slave controller, and a communication cable having formed thereon a first port to which the master controller is connected and a plurality of second ports to which the slave controller is connected. The first port includes an identification terminal configured to output an identification signal which is an electrical signal correspond- (Continued)

ing to the number of the second ports. A method of controlling the battery pack is provided.

6 Claims, 6 Drawing Sheets

(56) References Cited

U.S. PATENT DOCUMENTS

| | | |
|---|---|---|
| 2010/0080563 A1 | 4/2010 | DiFonzo et al. |
| 2010/0244770 A1* | 9/2010 | Yasuhito ............ H01M 10/441 320/121 |
| 2012/0246350 A1 | 9/2012 | Lee |
| 2015/0180244 A1 | 6/2015 | Jung et al. |
| 2015/0221993 A1* | 8/2015 | Wang .................. H01M 10/425 429/90 |
| 2016/0226263 A1 | 8/2016 | Seo et al. |
| 2016/0357504 A1 | 12/2016 | Khazin et al. |
| 2017/0223712 A1 | 8/2017 | Stephens et al. |
| 2018/0026467 A1 | 1/2018 | Shin et al. |

FOREIGN PATENT DOCUMENTS

| | | |
|---|---|---|
| KR | 10-2012-0107237 A | 10/2012 |
| KR | 10-2012-0130794 A | 12/2012 |
| KR | 10-2013-0089546 A | 8/2013 |
| KR | 10-1542094 B1 | 8/2015 |
| KR | 10-2016-0095524 A | 8/2016 |
| KR | 10-1696432 B1 | 1/2017 |
| KR | 10-2017-0013390 A | 2/2017 |

OTHER PUBLICATIONS

Bae Ji-youn; "Samsung SDI Partners Golf Cart 'E-Z-GO' to Supply LIB"; Asiatoday; Jan. 26, 2017, 6pp.; http://www.asiatoday.co.kr/view.php?key=20170126010017166.

EPO Extended European Search Report dated Mar. 15, 2021, issued in corresponding European Patent Application No. 18813080.1 (7 pages).

Chinese Office Action, Application No. 201880036872.X dated May 17, 2022, 9 pages; English Translation, 15 pages.

\* cited by examiner

BATTERY PACK AND METHOD FOR CONTROLLING BATTERY PACK

CROSS-REFERENCE TO RELATED APPLICATION(S)

This application is a National Phase Patent Application of International Patent Application Number PCT/KR2018/000951, filed on Jan. 22, 2018, which claims priority of Korean Patent Application No. 10-2017-0072723, filed Jun. 9, 2017. The entire contents of both of which are incorporated herein by reference.

TECHNICAL FIELD

The present disclosure relates to a battery pack and a method of controlling the battery pack

BACKGROUND ART

As portable electronic devices, for example, mobile phones, digital cameras, notebook computers, etc. are widely used, batteries for supplying power to operate the portable electronic devices are being actively developed. A battery is provided in the form of a battery pack with a protective circuit for controlling the charge and discharge of batteries, and a variety of researches has been conducted on a method and device for efficiently charging a battery.

A battery pack may include a plurality of battery modules. Each of the battery modules includes a controller for controlling the charge and discharge of a battery for management of the battery. Furthermore, the battery pack may include a master controller for controlling controllers included in a plurality of battery modules.

In the battery pack, the number of battery modules and connections thereof are previously determined considering the power consumption and rated voltage of a load connected thereto. However, when the number of battery modules included in the battery pack is less than a preset value, the battery pack may not supply an appropriate amount of power to the load, and furthermore, may request an excessive output from the battery module, thereby having a negative effect on the stability and lifespan of the battery module. Accordingly, the master controller needs to previously identify and estimate the number of battery modules to be included in a battery pack.

DETAILED DESCRIPTION OF THE DISCLOSURE

Technical Problem

Provided is a battery pack and a method of controlling the battery pack. In the battery pack, a master controller may obtain, from a dedicated communication cable, the number of a plurality of slave controllers that are scheduled to be connected, and thus the battery pack does not operate when the obtained number of slave controllers does not match the number of actually connected slave controllers.

Technical Solution

According to an aspect of the present disclosure, a battery pack includes a plurality of slave battery modules, each of the plurality of slave battery modules including a battery that includes at least one battery cell and a slave controller that is configured to control charge and discharge of the battery, a master battery module including a master controller configured to control the slave controller, and a communication cable having formed thereon a first port to which the master controller is connected and a plurality of second ports to which the slave controller is connected, wherein the first port includes an identification terminal configured to output an identification signal which is an electrical signal corresponding to the number of the plurality of second ports.

When the master controller is electrically connected to the identification terminal, the master controller may be further configured to detect the number of the plurality of second ports based on the identification signal and estimate the number of the battery modules included in the battery pack.

The master controller may be further configured to detect the number of the slave controllers connected to the second ports, and stop an operation when the detected number of the slave controllers and the number of the plurality of second ports according to the identification terminal are different from each other.

The identification terminal may include a plurality of identification pins, and the identification signal may be an electrical signal corresponding to the number and an arrangement order of identification pins electrically connected to each other among the plurality of identification pins.

The communication cable may be manufactured by electrically connecting at least two identification pins among the plurality of identification pins of the identification terminal.

The master controller may be further configured to store in advance a database that includes information about the number of the plurality of second ports corresponding to the number and the arrangement order of the plurality of identification pins that are electrically connected to each other.

When the master controller is electrically connected to the identification terminal, the master controller may be further configured to detect the number and the arrangement order of the plurality of identification pins electrically connected to each other, and obtain from the database the number of the plurality of second ports corresponding to the number and the arrangement order of the plurality of identification pins that are electrically connected to each other.

Among the plurality of identification pins, identification pins that are not electrically connected to each other may be open, and the plurality of identification pins that are electrically connected to each other may be grounded.

The battery pack may further include a notification unit configured to generate a notification signal under control of the master controller, wherein the master controller is further configured to control the notification unit to generate the notification signal when the slave controllers in a number corresponding to the number of the plurality of second ports are not connected.

According to another aspect of the present disclosure, a method of controlling a battery pack, the battery pack including a plurality of battery modules, a plurality of slave controllers respectively included in the plurality of battery modules, and a master controller configured to control the slave controllers, includes detecting the number of a plurality of second ports by receiving an identification signal from an identification terminal provided in a first port of a communication cable in which the first port connected to the master controller and the plurality of second ports respectively connected to the plurality of slave controllers are formed, detecting the number of the plurality of slave controllers connected to the plurality of second ports, and determining operation of the battery pack by comparing the number of the plurality of second ports with the number of the plurality of slave controllers connected to the plurality of second ports.

The determining of operation of the battery pack may include stopping operation of the battery pack when the number of the plurality of second ports and the number of the plurality of slave controllers are different from each other.

The determining of operation of the battery pack may further include resuming operation of the battery pack when the number of the plurality of second ports and the number of the plurality of slave controllers match each other.

The identification signal may be an electrical signal corresponding to the number and an arrangement order of identification pins electrically connected to each other among a plurality of identification pins.

The number and the arrangement order of the identification pins electrically connected to each other may be determined according to the number of the plurality of second ports.

The detecting of the number of the plurality of second ports may include checking the number and the arrangement order of the identification pins electrically connected to each other, according to the identification signal, and detecting the number of the plurality of second ports corresponding to the number and the arrangement order of the identification pins electrically connected to each other.

The method may further include outputting a notification signal to the outside when the number of the plurality of second ports and the number of the plurality of slave controllers are different from each other.

Advantageous Effects of the Disclosure

In the battery pack according to various embodiments and the method of controlling the battery pack, a master controller may estimate in advance the number of slave controllers to be connected, from a dedicated communication cable, and when the estimated number of slave controllers and the number of actually connected slave controllers do not match each other, the battery pack stops operation so that damage due to the instable output of a battery pack and the excessive output of a battery included in the battery pack caused by the number of slave controllers that are connected being different from an estimated number of slave controllers may be prevented.

BEST MODE

Provided is a method of controlling a battery pack, and a battery pack controlled by the method. A battery pack includes a plurality of slave battery modules, each of the slave battery modules including a battery that includes at least one battery cell and a slave controller that is configured to control charge and discharge of the battery, a master battery module including a master controller that is configured to control the slave controller, and a communication cable having formed thereon a first port to which the master controller is connected and a plurality of second ports to which the slave controller is connected. The first port includes an identification terminal configured to output an identification signal which is an electrical signal corresponding to the number of the second ports. A method of controlling the battery pack is provided.

MODE OF THE DISCLOSURE

As the disclosure allows for various changes and numerous embodiments, embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of the related art are omitted when it is deemed that they may unnecessarily obscure the essence of the disclosure.

Terms used in the present specification are used for explaining a specific embodiment, not for limiting the present disclosure. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof. Terms such as "first" and "second" are used herein merely to describe a variety of constituent elements, but the constituent elements are not limited by the terms. Such terms are used only for the purpose of distinguishing one constituent element from another constituent element.

Hereinafter, the present disclosure will be described in detail by explaining embodiments of the disclosure with reference to the attached drawings. Like reference numerals in the drawings denote like elements. Redundant descriptions thereof are omitted.

Figure 1:
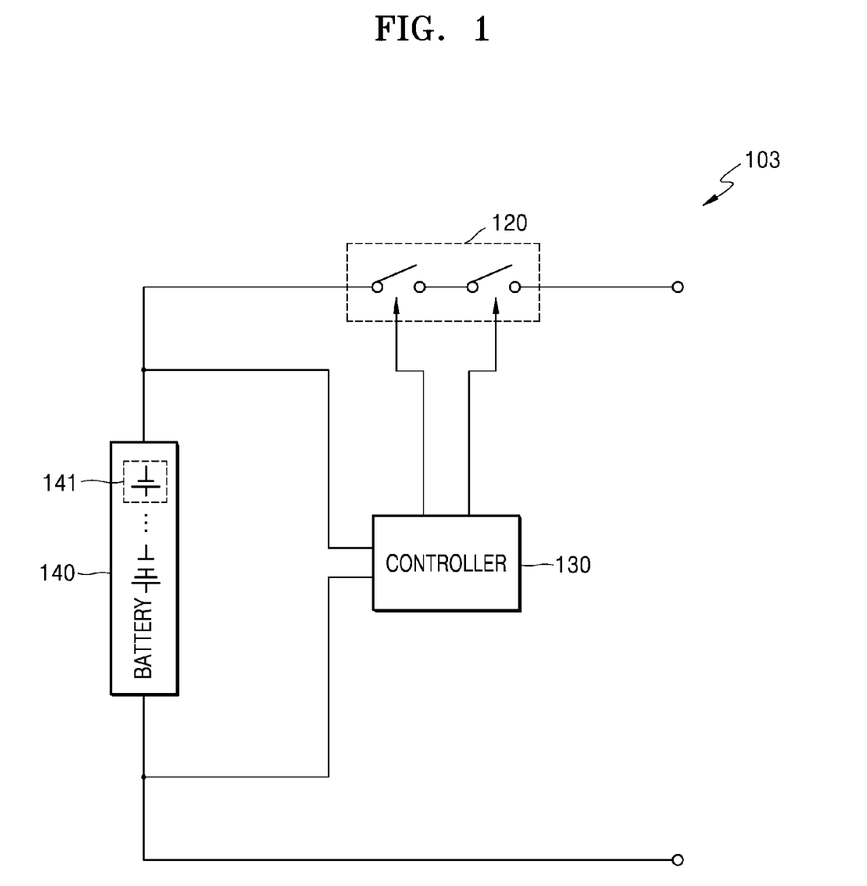
FIG. 1 is a schematic block diagram of an internal structure of a general battery module.

FIG. 1 is a schematic block diagram of an internal structure of a general battery module.

Referring to FIG. 1, a battery module 103 may include a charge/discharge switch 120, a battery 140, and a controller 130.

The battery 140 may include at least one battery cell 141 as a portion for storing electric power. The battery 140 may include one battery cell 141 or a plurality of battery cells 141. The battery cells 141 may be connected in series, in parallel, or in a combination of serial and parallel connections. The number and connection method of the battery cells 141 included in the battery 140 may be determined according to desired output voltage and power storage capacity.

The battery cell 141 may include a rechargeable secondary battery. For example, the battery cell 141 may include a nickel-cadmium battery, a nickel metal hydride battery (NiMH), a lithium ion battery, or a lithium polymer battery.

The controller 130 may include all types of devices capable of processing data, such as a processor, by analyzing a state of the battery 140 by monitoring the voltage and current of the battery 140, and controlling the charge and discharge of the battery 140 based on the analyzed state of the battery 140. A processor may mean, for example, a data processing device embedded in hardware and having a physically structured circuit to perform a function realized by codes or commands included in a program. As such, an example of the data processing device embedded in hardware may include a processor such as a microprocessor, a central processing unit (CPU), a processor core, a multiprocessor, a application-specific integrated circuit (ASIC), or a field programmable gate array (FPGA), but the present disclosure is not limited thereto.

In detail, the controller 130 may stop the charge or discharge of the battery 140 to protect the battery 140 when there is a possibility of overcharge, overdischarge, overcurrent, overvoltage, or overheat of the battery 140 based on the monitored state of the battery 140. In other words, when a situation is detected in which the battery 140 may be damage due to overcharge, overdischarge, overcurrent and high temperature, the controller 130 may open at least one of charge and discharge switches to stop the charge or discharge of the battery 140.

Furthermore, the controller 130 may calculate a remaining power amount, a degree of deterioration, or a state of charge based on a voltage and a current of the battery 140. The controller 130 may correct a reference value of overcharge or overdischarge of the battery 140 based on information about the calculated remaining power amount, degree of deterioration, and state of charge of the battery 140, or provide a user with the information by displaying the information on an external display portion.

The charge/discharge switch 120 is opened or closed according to the control of the controller 130. The charge/discharge switch 120 may be located on a path along which a charge or discharge current of the battery 140 flows, and thus when the charge/discharge switch 120 is opened by the control of the controller 130, the flow of the charge or discharge current of the battery 140 may be stopped. The charge/discharge switch 120 may include a transistor or a relay.

For example, the charge/discharge switch 120 may include a FET switch having a parasitic diode. In a parasitic diode of a charge switch, a direction in which a discharge current of the battery 140 flows is a forward direction, and in a parasitic diode of a discharge switch, a direction in which a charge current of the battery 140 flows is a forward direction. In this case, when the charge switch is turned off and the discharge switch is turned on, the flow of the charge current of the battery 140 may be stopped, but the discharge current of the battery 140 may flow through the discharge switch and the parasitic diode of the charge switch. In contrast, when the charge switch is turned on and the discharge switch is turned off, the flow of the discharge current of the battery 140 may be stopped, but the charge current of the battery 140 may flow through the charge switch and the parasitic diode of the discharge switch.

An external terminal of the battery module 103 may be connected to an external load device or a charger, or another battery module 103, in parallel or in series. The battery module 103 may include a plurality of battery modules, and the battery modules 103 may be connected to each other in series, in parallel, or in a combination of serial and parallel connections to have a desired voltage and power storage capacity.

In this case, the controller 130 of any one of the battery modules 103 may be configured to control the controllers 130 of the other battery modules 103. In the following description, the controller 130 that controls the controllers 130 of the other battery modules 103 is defined to be a master controller 131 and the controllers 130 that are controlled by the master controller 131 is defined to be the slave controllers 133.

Figure 2:
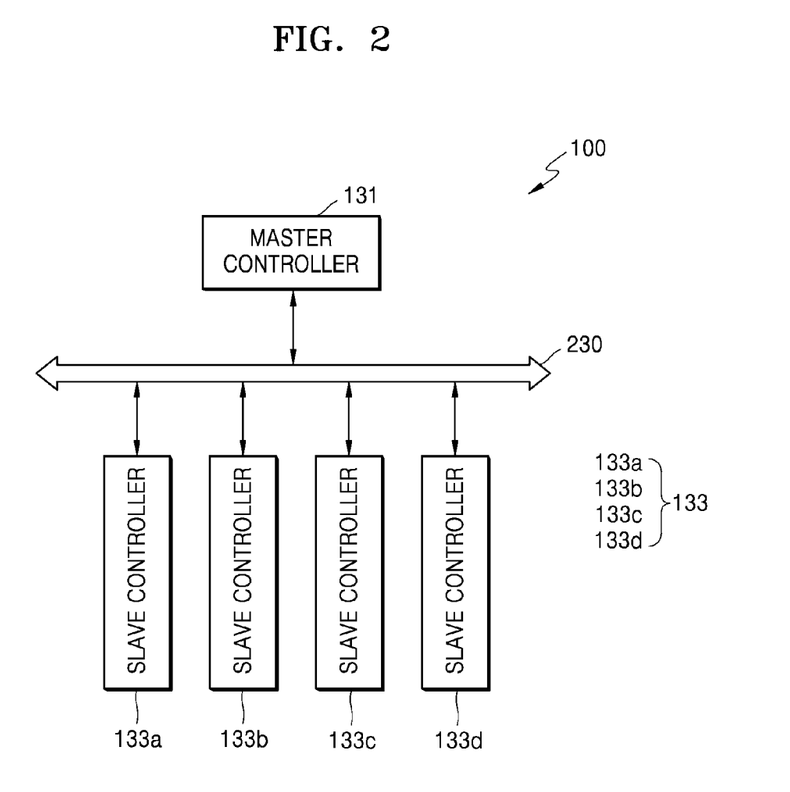
FIG. 2 schematically illustrates a battery pack according to an embodiment.

FIG. 2 schematically illustrates a battery pack according to an embodiment.

Referring to FIG. 2, a battery pack 100 may include the master controller 131 and the slave controllers 133.

A plurality of slave controllers 133a to 133d, like the controller 130 described with reference to FIG. 1, may obtain information about the voltage and current of the battery 140, and detect a state of the battery 140 such as a state of charge of the battery 140 based on the obtained information about the voltage and current of the battery 140. The slave controllers 133a to 133d may be controlled according to a control signal of the master controller 131 or may transmit a response signal in response to the control signal of the master controller 131 to the master controller 131.

When there is a request from the master controller 131, the slave controllers 133a to 133d may transmit the information to the master controller 131. The response signal may include information about the voltage and current of the battery 140 or information about the state of the battery 140, in response to a request signal that the slave controllers 133 receive from the master controller 131.

The master controller 131 may determine a state of charge or a degree of deterioration of each of the batteries 140 based on the information about the voltages and currents of the batteries 140 that the slave controllers 133a to 133d transmitted. The master controller 131 may transmit a control signal related to control of the charge and discharge of the slave controllers 133a to 133d based on the information transmitted by the slave controllers 133a to 133d.

According to an embodiment, the master controller 131 and the slave controllers 133 may transceive a control signal and a response signal through a single communication line 230. The master controller 131 and each of the slave controllers 133 are connected to each other not by separate communication lines, but by the communication line 230 that is single. In this case, an identifier is set to each of the slave controllers 133, and the master controller 131 includes the identifier corresponding to a slave controller that is an object to be controlled in the slave controller. Accordingly, the master controller 131 may output a control signal to the communication line 230 so that only a predetermined slave controller is controlled. For example, the master controller 131 and the slave controllers 133 may use a controller are network (CAN) communication protocol by using the communication line 230. However, the present disclosure is not limited thereto, and any communication protocol capable of transmitting data or a command using a bus line may be used therefor.

Figure 3:
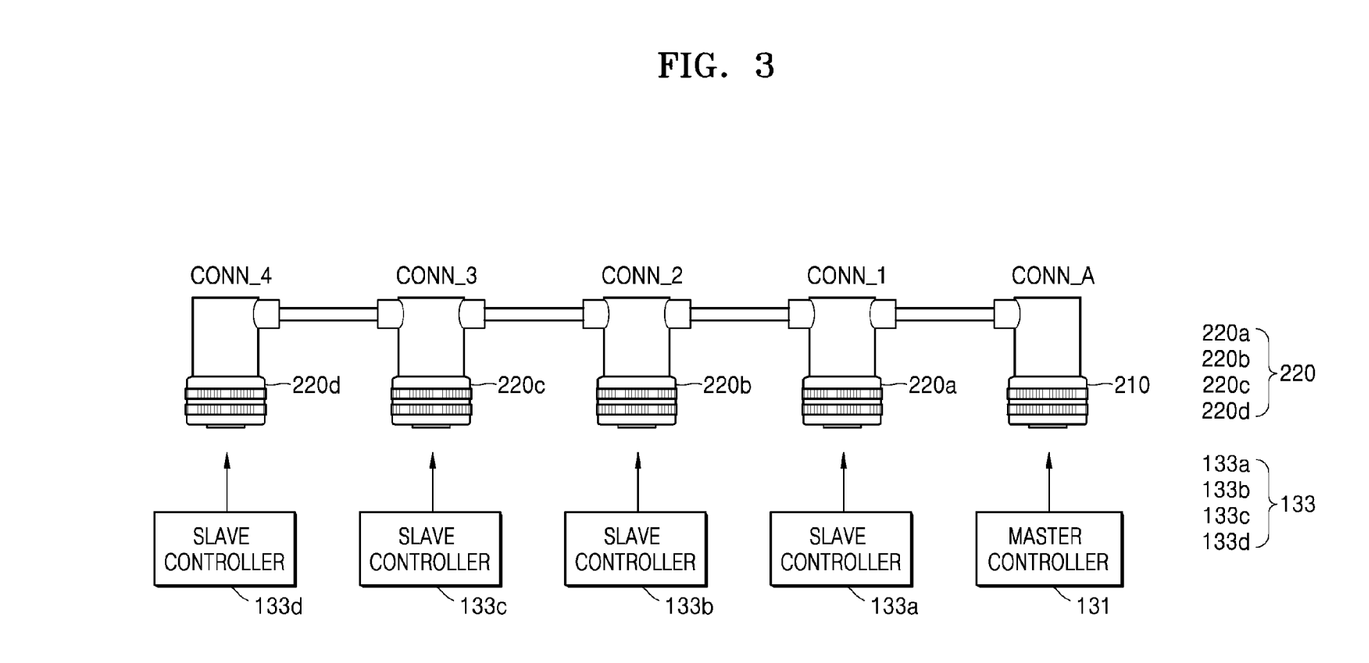
FIG. 3 schematically illustrates a communication cable according to an embodiment.

FIG. 3 schematically illustrates a communication cable according to an embodiment.

Referring to FIG. 3, as described with reference to FIG. 2, a communication cable 200 may provide the communication line 230 by electrically connecting the master controller 131 to the slave controllers 133a to 133d. A first port 210 connected to the master controller 131 and second ports 220a to 220d respectively connected to the slave controllers 133a to 133d are provided on the communication cable 200 that is a single line so that the master controller 131 is connected to each of the slave controllers 133a to 133d on a single line.

The communication cable 200 may be provided with the first port 210 and a plurality of second ports 220. On the communication cable 200, the master controller 131 is connected to the first port 210, and the slave controllers 133 are connected to the second ports 220. The communication cable 200 provides the communication line 230 that is a single line, between the master controller 131 connected to the first port 210 and the slave controllers 133 respectively connected to the second ports 220. In this case, the master controller 131 controls each of the slave controllers 133 using the communication line 230 that is a single line.

The communication cable 200 may further include an identification terminal that provides an identification signal separate from the communication line 230 to the first port 210. The identification terminal may include a plurality of identification pins that are arranged in a preset arrangement order. In the identification terminal, at least two identification pins of a plurality of identification pins are electrically connected to each other to output identification signals corresponding to the number of the second ports 220. The identification terminal is manufactured such that the identification pins electrically connected to each other of the identification pins are determined in advance according to the number of the second ports formed on the communication cable 200. In this case, the identification terminal may output identification signals that are various electrical signals, by changing the number and arrangement order of identification pins that are electrically connected to each other.

For example, the identification terminal may include a plurality of identification pins, and at least two of the identification pins are electrically connected to each other in the communication cable 200, whereas the other identification terminals are opened. In this case, the identification terminal may have different voltages be output between the identification pins that are electrically connected to each other and the identification pins that are not electrically connected to each other. The master controller 131 may sense the different voltages and detect the identification signal.

Furthermore, when a first identification pin to a sixth identification pin are arranged in a preset arrangement order, and the first identification pin to the third identification pin are electrically connected one another, the master controller 131 may define the identification pins that are electrically connected to each other, to be 1, and the other identification pins to be 0. Accordingly, the master controller 131 may detect an identification signal of 111000 that is binarized according to the arrangement order of the first identification pin to the third identification pin that are electrically connected to one another.

The master controller 131 may transmit control signals to the slave controllers 133 connected to each of the second ports 220a to 220d through the communication line 230. The master controller 131 may control only a certain slave controller corresponding to an identifier by applying a control signal including the identifier corresponding to the slave controller to be controlled among the slave controllers 133a to 133d. In other words, a separate identifier is previously set to each of the slave controllers 133a to 133d, and the master controller 131 may output a control signal including an identifier corresponding to a slave controller to be controlled among the slave controllers 133a to 133d, and control only the slave controller to be controlled with the communication line 230 that is a single line.

In detail, the master controller 131 outputs, to the first port 210, a control signal including information about an identifier corresponding to a slave controller to be controlled among the slave controllers 133a to 133d. Even when the control signal output from the master controller 131 is transmitted to the slave controllers 133a to 133d, only a slave controller corresponding to the identifier included in the control signal may be controlled in response to the control signal. In other words, even when the master controller 131 and the slave controllers 133a to 133d are connected by the communication line 230 that is a single line, the master controller 131 may have only a particular slave controller be controlled by using the identifier. Since all methods by which the master controller 131 may control a specific slave controller to be controlled among the slave controllers 133a to 133d using the communication line 230 that is a single line may be employed, the present disclosure is not limited to the above-described control method using the identifier.

Figure 4:
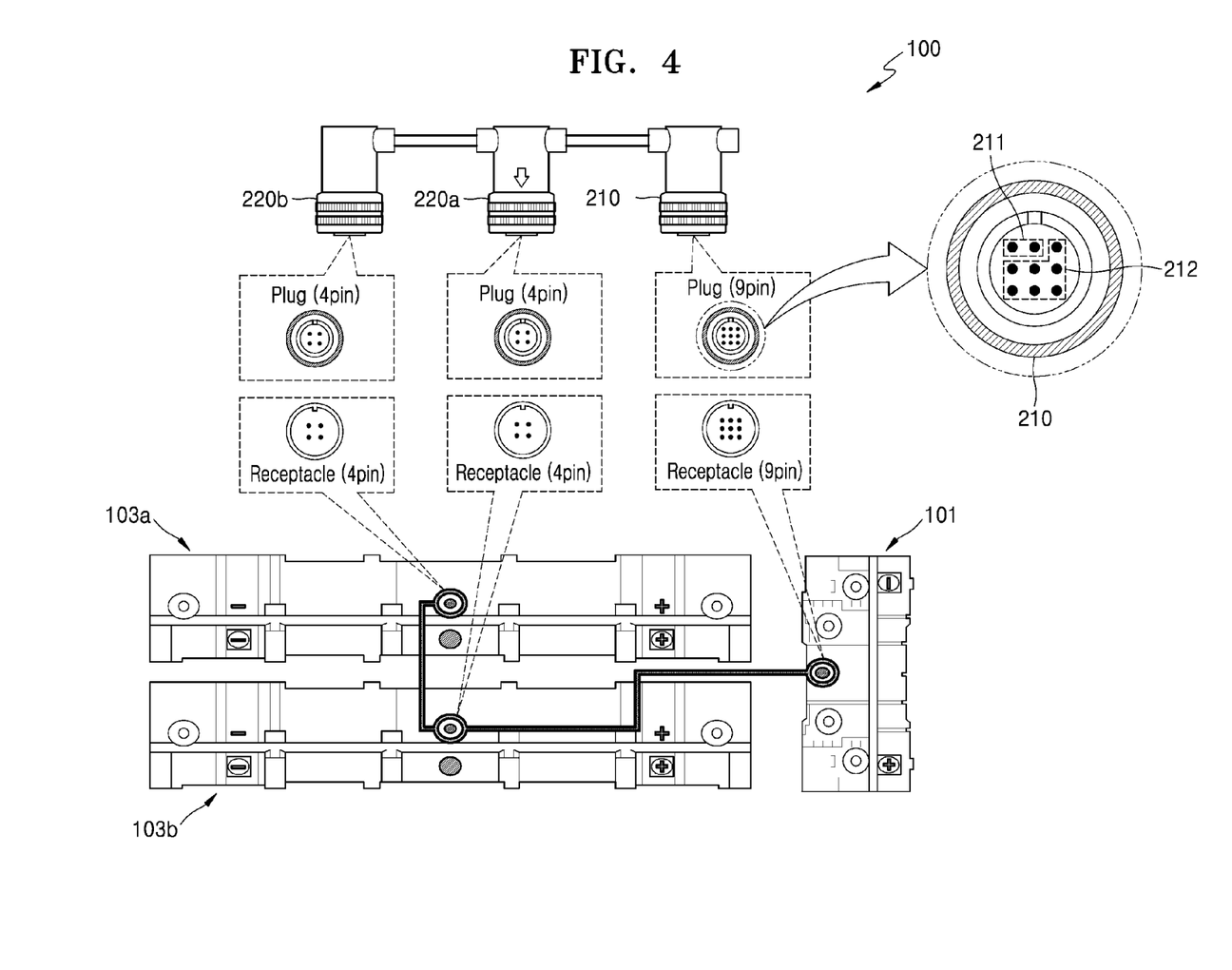
FIG. 4 illustrates an example of a connection relationship between a communication cable and a controller, according to an embodiment.

FIG. 4 illustrates an example of a connection relationship between a communication cable and a controller, according to an embodiment.

Referring to FIG. 4, the communication cable 200 may include the first port 210 and the second ports 220a and 220b. The first port 210 and the second ports 220a and 220b may include communication pins electrically connected to the communication line 230. The first port 210 may include an identification terminal 212 that generates a preset electrical signal.

Each of the second ports 220a and 220b may include a first pin to a fourth pin. The slave controllers 133 located adjacent to each other are electrically connected to each other via the first to fourth pins, thereby forming the communication line 230 that is a single line. For example, a certain slave controller connected to the second port 220b is electrically connected to the slave controller 133a that is adjacent thereto and connected through a first communication pin and a second communication pin, and electrically connected to another slave controller 133c (see FIG. 3) through a third communication pin and a fourth communication pin. In this method, the slave controllers 133a and 133b connected to the second ports 220 may be connected to the communication line 230 that is a single line.

The first port 210 may include two communication pins 211 electrically connected to the second ports 220a and 220b by one communication line and capable of communicating, and additionally the identification terminal 212 including seven identification pins for generating identification signals. Each of the two communication pins 211 of the first port 210 is electrically connected to at least one of the first pin to the fourth pin of the second port 220b, and thus the master controller 131 and the slave controllers 133a and 133b are electrically connected through the communication line 230 that is a single line. The number of identification pins included in the identification terminal is not limited to seven illustrated in FIG. 4, and may be several to tens of identification pins, as necessary. However, for convenience of explanation, the identification terminal is described as having seven identification pins in the following description.

The identification terminal 212 may include seven identification pins, and at least two pins of the seven identification pins are electrically connected to each other. The identification signal may be an electrical signal according to the number and arrangement order of the identification pins that are electrically connected to each other of the seven identification pins. For example, when the identification pins that are electrically connected to each other are grounded and the other identification pins are opened, the identification pins that are electrically connected to each other are in a low (Low) state and the other identification pins are in a high impedance (Hi-Z) state. In this state, the identification signal may provide an electrical signal that varies according to the arrangement order of the identification pins that are electrically connected to each other to the master controller 131 connected to the identification terminal 212. In other words, when the identification terminal 212 includes seven identification pins, the identification terminal 212 may output 128 various identification signals by varying the number and arrangement order of the electrically connected identification pins.

Although the seven identification pins are electrically connected to one another, the communication line 230 and the second ports 220*a* and 220*b* are not electrically connected to each other.

For example, when the identification terminal 212 includes four identification pins, a first identification pin and a second identification pin are electrically connected to each other, and third identification pin and fourth identification pin are opened, the identification terminal 212 may output an identification signal in which the first identification pin and the second identification pin are in a low state and the third identification pin and the fourth identification pin are in a high state. In this state, the master controller 131 may detect the identification signal according to the number and arrangement order of the identification pins that are electrically connected to each other of the identification pins. In this case, the master controller 131 may detect an electrical signal binarized to 0011 as the identification signal.

According to an embodiment, the master controller 131 may detect the identification signal by checking the identification pins that are electrically connected to each other of the seven identification pins of the identification terminal 212. In this state, the master controller 131 detects the identification signal based on the number and arrangement order of the identification pins that are electrically connected to each other. For example, when the identification terminal 212 includes a first identification pin to a sixth identification pin in which the first identification pin, the third identification pin, and the fourth identification pin are electrically connected to one another, the master controller 131 may check that the first identification pin, the third identification pin, and the fourth identification pin are electrically connected to one another. In this state, the master controller 131 may binarize the identification pins electrically connected to each other to 1 and the other identification pin to 0, according to a preset condition. In this case, the master controller 131 may detect a binary signal of 101100 as an identification signal.

The arrangement order and number of the identification pins that are electrically connected to each other are defined to be combination information of identification pins according to the number of the second ports 220. The master controller 131 may check the combination information of the identification pins by detecting the identification pins that are electrically connected to each other by measuring the voltages of the identification pins. In this regard, the combination information of the identification pins checked by the master controller is an identification signal, a database (DB) 160 including information about the number of the second ports 220 corresponding to the identification signal is previously stored.

For example, when the identification terminal includes four identification pins, and the master controller 131 detects identification pins electrically connected to each other to be 0, and the other identification pins to be 0, the database 160 may include information about a correlation between the identification signal and the number of second ports, for example, when the identification signal is 1000, the number of the second ports 220 is 2, when the identification signal is 1001, the number of the second ports 220 is 3, and when the identification signal is 1100, the number of the second ports 220 is 4. In other words, the master controller 131 may detect the identification signal of the first to fourth identification pins according to the number and arrangement order of the identification pins that are electrically connected to each other, and obtain, from the database 160, the number of the second ports 220 corresponding to the detected identification signal.

According to an embodiment, the identification pins that are electrically connected to each other of a plurality of identification pins are grounded, and the other identification pins are opened. In this case, each of the identification pins is 0 or in a high impedance (Hi-Z) state. In this state, the master controller 131 may detect the identification signal by obtaining the combination information of the identification pins, that is, the number and arrangement order of the identification pins that are electrically connected to each other, by measuring a voltage level of each of the pins the identification signal. The master controller 131 obtains, from the database 160, the number of the second ports 220 corresponding to the detected identification signal.

Figure 5:
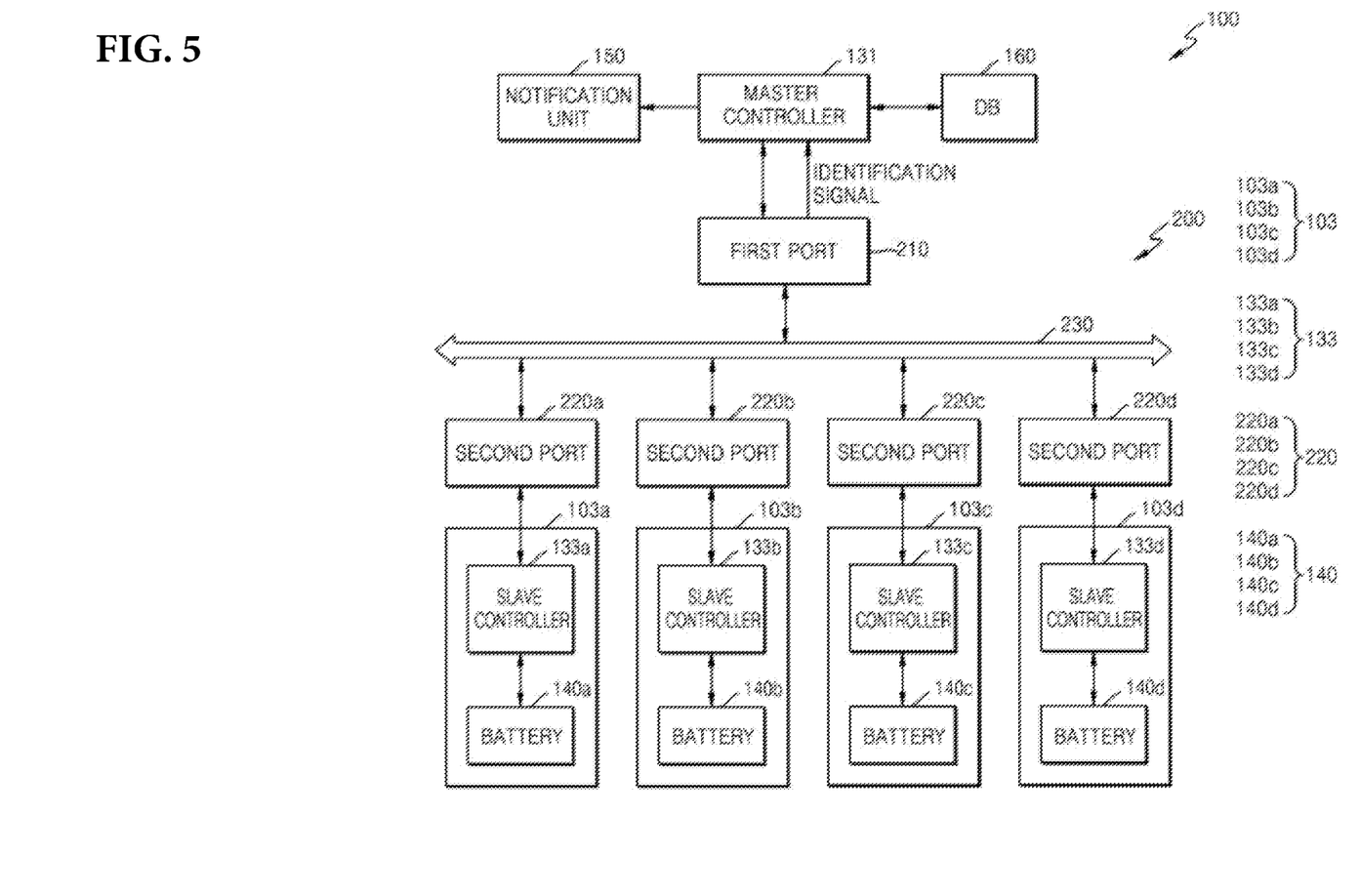
FIG. 5 is a schematic block diagram of an internal structure of a battery pack according to an embodiment.

FIG. 5 is a schematic block diagram of an internal structure of a battery pack according to an embodiment.

Referring to FIG. 5, the battery pack 100 may include slave battery modules 103*a* to 103*d*, a master battery module 101, and the communication cable 200. The communication cable 200 may include the first port 210, the second ports 220*a* to 220*d*, and the communication line 230.

The battery pack 100 may include the slave battery modules 103*a* to 103*d* connected to one another in series, in parallel, or a combination of serial and parallel connections. The battery pack 100 may include the slave battery modules 103*a* to 103*d* connected in series or in parallel to have a rated power corresponding to power consumption of a load to be connected. For example, when an electric bike that is a load has a power consumption of 3000 W and a rated voltage of 100 V, an appropriate number of the battery modules 103 in a mixed form of serial and parallel connections may be included to appropriately output the power consumption and the rated voltage.

Each of the slave battery modules 103*a* to 103*d* may include a slave controller corresponding thereto of the slave controllers 133*a* to 133*d*. Each of the slave controllers 133*a* to 133*d* may monitor a current and a voltage of a corresponding battery, and the master controller 131 may control the slave controllers 133*a* to 133*d*. The master battery module 101 may include the master controller 131 and the battery 140 or only the master controller 131. In the following description, for convenience of explanation, it is assumed that the master battery module 101 includes only the master controller 131.

The battery pack 100 may include the communication cable 200 that provides the communication line 230 that is a single line. The communication cable 200 may include the first port 210 to which the master controller 131 is electrically connected and the second ports 220*a* to 220*d* to which the slave controllers 133*a* to 133*d* are respectively one-to-one connected. The master controller 131 connected to the first port 210 may apply control signals to the slave controllers 133a to 133d respectively corrected to the second ports 220a to 220d or receive response signal from the slave controllers 133a to 133d.

According to an embodiment, when starting an operation, the master controller 131 applies a control signal requesting a response signal to each of the slave controllers 133a to 133d through the communication line 230. Each of the slave controllers 133a to 133d to which the control signal is applied outputs a response signal to the control signal through the communication line 230. The master controller 131 may check the number of the slave controllers 133a to 133d based on the received response signal. In this state, the number of the slave controllers 133a to 133d connected to the second ports 220a to 220d may be assumed to correspond to the number of the slave battery modules 103a to 103d included in the battery pack 100. In the following description, the number of the slave controllers 133a to 133d and the number of the slave battery modules 103a to 103d are described to be corresponding to each other.

The slave controllers 133a to 133d are connected to the second ports 220a to 220d, and receive the control signal of the master controller 131 applied to the first port 210. Each of the slave controllers 133a to 133d is assigned with an identifier corresponding thereto. In this state, a slave controller of the slave controllers 133a to 133d, which is assigned with an identifier corresponding to the identifier included in the control signal applied by the master controller 131, is controlled corresponding to the control signal, and the other slave controllers are not controlled by the control signal.

The master controller 131 is connected, through the first port 210, to the communication line 230 to which the slave controllers 133a to 133d are electrically connected, and furthermore, is electrically one-to-one connected to each of a plurality of identification pins of the identification terminal 212 additionally provided in the first port 210. The identification terminal 212 may output an identification signal that is a signal corresponding to the number of the second ports 220 provided on the communication cable 200, and the master controller 131 may recognize the number of the second ports 220 by detecting and analyzing the identification signal.

In detail, the master controller 131 detects the electrically connected identification pins of the identification pins by measuring a voltage level of each of the identification pins. The master controller 131 may detect the identification signal according to the number and arrangement order of the detected identification pins. The master controller 131 may obtain the number of the second ports 220 corresponding to the detected identification signal, from the database 160 that includes information about the number of the second ports 220 corresponding to the identification signal.

According to an embodiment, the master controller 131 determines whether to start or stop the charge or discharge of the battery pack 100, by comparing a first number that is the number of the slave controllers 133 connected to the communication line 230 with a second number that is the number of the second ports 220. The master controller 131 detects the second number that is the number of the second ports 220 corresponding to the identification signal, from the identification terminal 212, and detects the first number that is the number of the slave controllers 133 through the communication line 230. The master controller 131 compares the first number with the second number, and when the first number and the second number match each other, starts the charge or discharge of the battery pack 100. Contrary to the above, when the first number and the second number are different from each other, the master controller 131 stops the charge or discharge of the battery pack 100. For example, according to the illustration of FIG. 5, the master controller 131 may detect four first numbers and four second numbers.

According to an embodiment, when the first number and the second number are different from each other, and thus the charge or discharge of the battery pack 100 is stopped, the master controller 131 may frequently detect again the first number to repeatedly determine whether the first number matches the second number. In this state when the first number is different from the second number, the master controller 131 stops the charge or discharge of the battery pack 100 and notifies that an incorrect number of the slave battery modules 103 are connected, through an external notification unit 150. In this state, when a user connects later a correct number of the slave controllers 133 (or the slave battery module) matching the second number, the master controller 131 may detect the connection and resume the charge or discharge of the battery pack 100.

As such, when the number of the second ports 220 and the number of the slave controllers 133 are different from each other, the master controller 131 may stop output of the battery pack 100 and prevent damage and breakage due to excessive output of the battery module 103 included in the battery pack 100.

For example, when the number of the second ports 220 of the communication cable 200 is three, the battery pack 100 is designed to supply an output according to the connection of three slave battery modules 103, as a rated output, to a load. However, when two slave battery modules 103 only are connected due to a user's arbitrary design change, the battery pack 100 may not supply an appropriate output to the load, and an excessive output is needed from the two slave battery modules 103 so that the two slave battery modules 103 may be damaged and broken.

To address the above problem in advance, the master controller 131 may detect the number of the slave battery modules 103 scheduled to be included in the battery pack 100 from the number of the second ports 220, from the identification terminal 212, and when the detected number of the slave battery modules 103 (that is, the number of the second ports) and the number of the slave controllers 133 actually connected to the communication line 230 are different from each other, stop the charge or discharge of the battery pack 100 to protect the slave battery modules 103 included the battery pack 100 and the load.

In other words, the master controller 131 starts the charge or discharge of the battery pack 100 only when a previously scheduled number of the slave battery modules 103 are connected to the dedicated communication cable 200 on which a number of the second ports 220 corresponding to the previously scheduled number of the battery modules 103 are formed. Accordingly, the user's arbitrary design change of the number and type of the slave battery modules 103 to make the battery pack 100 have valves different from the requested values of the output and voltage of the battery 140, and the generation of an abnormal state of the slave battery modules 103 due to the change in the number and type of the slave battery modules 103.

Figure 6:
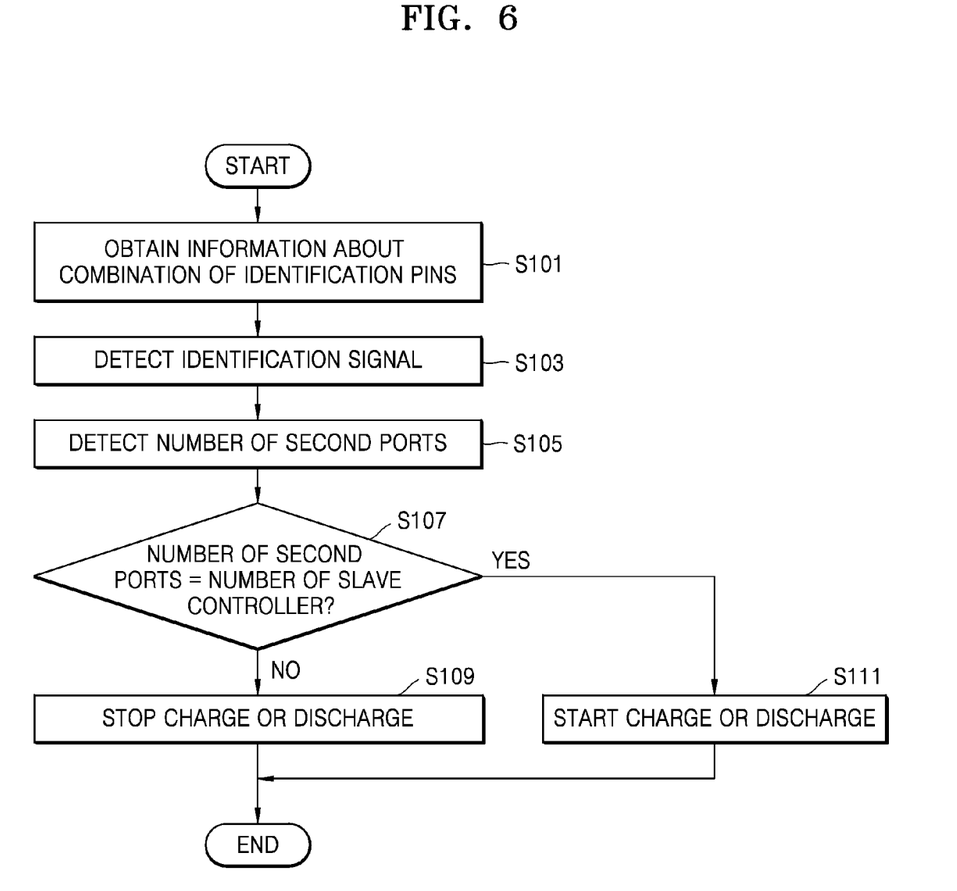
FIG. 6 is a flowchart of a method of controlling the charge and discharge of a battery pack, according to an embodiment.

FIG. 6 is a flowchart of a method of controlling the charge and discharge of a battery pack according to an embodiment.

Referring to FIG. 6, when the battery pack 100 is electrically connected to the identification terminal 212, the number and arrangement order of the identification pins electrically connected to each other of a plurality of identification pins included in the identification terminal 212 are checked (S101).

The battery pack 100 may detect an identification signal according to the checked number and arrangement order of the identification pins that are electrically connected to each other. For example, when a first identification pin to a sixth identification pin are arranged in a previously set arrangement order, and the first identification pin to the third identification pin are electrically connected to each other, the battery pack 100 may measure the voltage levels of the identification pins, check whether the first identification pin to the third identification pin are electrically connected to one another, and detect an identification signal binarized to 111000 (S103).

The battery pack 100 may obtain the number of the second ports 220 corresponding to the identification signal, from the database 160 that is previously stored. The database 160 may contain information about the number of the second ports 220 corresponding to the identification signal according to the number and arrangement order of the electrically connected identification pins. For example, when the identification terminal 212 includes the first identification pin to the fourth identification pin, the database 160 includes information about a correlationship between the identification signal and the number of second ports, for example, there are two second ports 220 when the identification signal is 1000, there are three second ports 220 when the identification signal is 1001, and there are four second ports 220 when the identification signal is 1100. In this case, the battery pack 100 may obtain the number of the second ports 220 corresponding to the detected identification signal, from the database 160 that is previously stored (S105).

The battery pack 100 compares the number of the second ports 220 corresponding to the identification signal with the number of the slave controllers 133 connected to the second ports 220. The number of the slave controllers 133 connected to the second ports 220 may be detected as the number of the slave controllers 133 that respond to the control signal of the master controller 131 through the communication line 230 (S107).

The battery pack 100 stops or does not start charge or discharge when the second number that is the number of the second ports 220 and the first number that is the number of the slave controllers 133 connected to the second ports 220 are different from each other. The battery pack 100 determines that an appropriate number of the battery modules 103 that are previously scheduled are not currently connected, and stops the charge or discharge of the battery 140 until a previously scheduled number of the battery modules 103 are connected. Accordingly, the battery pack 100 stops charge or discharge when it is not a state in which stable power is supplied to an electrically connected load, to prevent the battery 140 included in the battery pack 100 from being damaged by excessive output or undesired output of the battery pack 100 according to user's arbitrary design change from being transferred to the load, thereby guaranteeing safe use of the battery pack 100 and stable power supply of the battery pack 100 (S109).

Furthermore, even when a slave controller does not normally respond due to malfunction, the first number and the second number are detected to be different from each other, and thus the battery pack may stop the charge and discharge of batteries for safety.

Contrary to the above, when the first number and the second number match each other, scheduled output may be stably supplied to the electrically connected load, and thus the battery pack 100 may start or resume the charge and discharge (S111).

While one or more embodiments have been described with reference to the figures, it will be understood by those of ordinary skill in the art that various changes in form and details may be made therein without departing from the spirit and scope as defined by the following claims.

The invention claimed is:

1. A method of controlling a battery pack, the battery pack comprising a plurality of battery modules, a plurality of slave controllers respectively included in the plurality of battery modules, and a master controller configured to control the slave controllers, the method comprising:
   detecting a number of a plurality of second ports by receiving an identification signal from an identification terminal provided in a first port of a communication cable in which the first port connected to the master controller and the plurality of second ports respectively connected to the plurality of slave controllers are formed;
   detecting a number of the plurality of slave controllers connected to the plurality of second ports; and
   stopping operation of the battery pack when the number of the plurality of second ports and the number of the plurality of slave controllers are different from each other.

2. The method of claim 1, wherein the further comprising resuming the operation of the battery pack when the number of the plurality of second ports and the number of the plurality of slave controllers match each other.

3. A method of controlling a battery pack, the battery pack comprising a plurality of battery modules, a plurality of slave controllers respectively included in the plurality of battery modules, and a master controller configured to control the slave controllers, the method comprising:
   detecting a number of a plurality of second ports by receiving an identification signal from an identification terminal provided in a first port of a communication cable in which the first port connected to the master controller and the plurality of second ports respectively connected to the plurality of slave controllers are formed;
   detecting a number of the plurality of slave controllers connected to the plurality of second ports; and
   determining operation of the battery pack by comparing the number of the plurality of second ports with the number of the plurality of slave controllers connected to the plurality of second ports,
   wherein the identification signal is an electrical signal corresponding to a number and an arrangement order of identification pins electrically connected to each other among a plurality of identification pins.

4. The method of claim 3, wherein the number and the arrangement order of the identification pins electrically connected to each other are determined according to the number of the plurality of second ports.

5. The method of claim 4, wherein the detecting of the number of the plurality of second ports comprises:
   checking the number and the arrangement order of the identification pins electrically connected to each other, according to the identification signal; and
   detecting the number of the plurality of second ports corresponding to the number and the arrangement order of the identification pins electrically connected to each other.

6. The method of claim 1, further comprising outputting a notification signal when the number of the plurality of second ports and the number of the plurality of slave controllers are different from each other.

\* \* \* \* \*

UNITED STATES PATENT AND TRADEMARK OFFICE
CERTIFICATE OF CORRECTION

PATENT NO. : 11,527,901 B2
APPLICATION NO. : 16/620673
DATED : December 13, 2022
INVENTOR(S) : Youngjin Lee et al.

It is certified that error appears in the above-identified patent and that said Letters Patent is hereby corrected as shown below:

In the Claims
Column 14, Line 29, Claim 2 After "claim 1," delete "wherein the"

Signed and Sealed this
Fourth Day of April, 2023

Katherine Kelly Vidal
*Director of the United States Patent and Trademark Office*